US005540620A

United States Patent [19]

Haneda et al.

[11] Patent Number: 5,540,620
[45] Date of Patent: Jul. 30, 1996

[54] TORQUE VIBRATION ABSORBING DEVICE

[75] Inventors: Yoshitomi Haneda; Hiroshi Suzuki, both of Anjo, Japan

[73] Assignee: Aisin Seiki Kabushiki Kaisha, Kariya, Japan

[21] Appl. No.: 458,277

[22] Filed: Jun. 2, 1995

Related U.S. Application Data

[63] Continuation of Ser. No. 46,162, Apr. 15, 1993, abandoned.

[30] Foreign Application Priority Data

Apr. 17, 1992 [JP] Japan ..................... 4-097902

[51] Int. Cl.$^6$ ..................... F16D 3/66
[52] U.S. Cl. ................ 464/64; 192/213; 464/68
[58] Field of Search ............. 464/64, 68; 192/106.2, 192/212, 213, 70.17

[56] References Cited

U.S. PATENT DOCUMENTS

| 2,574,573 | 11/1951 | Libby . | |
|---|---|---|---|
| 4,410,075 | 10/1983 | Caray et al. | 464/68 |
| 4,485,909 | 12/1984 | Gatewood | 464/68 |
| 4,537,580 | 8/1985 | Loizeau et al. | 464/64 |
| 4,557,702 | 12/1985 | Takuchi et al. . | |
| 4,560,366 | 12/1985 | Loizeau | 464/68 |
| 4,573,562 | 3/1986 | DeLand | 464/68 |
| 4,674,992 | 6/1987 | Carmillet et al. | 464/68 |
| 4,698,045 | 10/1987 | Billet et al. | 464/64 |
| 4,908,004 | 3/1990 | Graton et al. | 464/64 |
| 5,052,978 | 10/1991 | Hanke | 464/68 |

FOREIGN PATENT DOCUMENTS

| 286213 | 10/1988 | European Pat. Off. . |
| 2113803 | 8/1983 | United Kingdom . |
| 2151750 | 7/1985 | United Kingdom . |

Primary Examiner—Daniel P. Stodola
Assistant Examiner—Eileen A. Dunn
Attorney, Agent, or Firm—Burns, Doane, Swecker & Mathis, L.L.P.

[57] ABSTRACT

A torque vibration absorbing device includes a clutch hub with a flange extending radially, a pair of intermediate plates disposed at both outsides of the flange so as to be rotatable relative to the flange, a disc plate and a sub-plate disposed at the outside of the intermediate plates so as to be rotatable relative to the flange and the intermediate plates, a plurality of connecting pins which connect the disc plate and the sub-plate, and a plurality of elastic members provided in series at the inside of the disc plate and the sub-plate through the intermediate plates, wherein at least one elastic member is maintained at a predetermined amount of compression when a torsional degree between the flange and each of the disc plate and the sub-plate is changed to be larger than the predetermined amount thereof and the other elastic members are continued to be compressed exceeding the predetermined amount of compression.

11 Claims, 6 Drawing Sheets

Moving Quantity of the flange 3 = 0

$0 <$ Moving Quantity of the flange 3 $< 2X_2$

Moving Quantity of the flange 3 $= 2X_2$

Moving Quantity of the flange 3 $> 2X_2$

TORQUE VIBRATION ABSORBING DEVICE

This application is a continuation of application Ser. No. 08/046,162, filed Apr. 15, 1993, now abandoned.

BACKGROUND OF THE INVENTION

1. Field of the invention

This invention relates to a torque vibration absorbing device for use in a driving axle system, such as a clutch disc or a flywheel.

2. Description of the Related Art

A conventional torque vibration absorbing device is disclosed in the U.S. Pat. No. 2,574,573. The torque vibration absorbing device disclosed in the prior art comprises a clutch hub with a flange extending radially and a pair of intermediate plates disposed at both outsides of the flange so as to be rotatable relative to the intermediate plates. The device includes a disc plate and a sub-plate disposed at the outsides of the intermediate plates so as to be rotatable relative to the flange and the intermediate plates. Furthermore the device comprises a plurality of torsion springs provided in series at the inside of the disc plate and the sub-plate by through the intermediate plates. Therefore the device is able to establish the torsional torque which is generated between the flange and each of the disc plate and the sub-plate so as to be lower relative to the torsional angle between the flange and each of the disc plate and the sub-plate, and is able to reduce the vibration and the noise in a series of a driving axle effectively.

However with the above construction the device sometimes becomes poor in durability due to the reduction of the maximum torque, that is to say stopper torque, permitted under the region of the wide torsional angle between the flange and each of the disc plate and the sub-plate.

SUMMARY OF THE PRESENT INVENTION

It is an object of the present invention to provide a torque vibration absorbing device which increases its durability without any additional elastic member and achieves the increasing of the stopper torque.

It is another object of the present invention to provide a torque vibration absorbing device possessing the simple structure and the small size.

It is a further object-of the present invention to provide a torque vibration absorbing device achieving to be constituted within a low cost.

It is a further object of the present invention to provide a torque vibration absorbing device which increases its torsional angle to be able to be used.

To achieve the above mentioned objects, this invention provides a torque vibration absorbing device comprising: a clutch hub with a flange extending radially, a pair of intermediate plates disposed at both outsides of the flange so as to be rotatable relative to the flange, a disc plate and a sub-plate disposed at the outsides of the intermediate plates so as to be rotatable relative to the flange and the intermediate plates, a plurality of connecting pins which connect the disc plate and the sub-plate, and a plurality of elastic members provided in series at the inside of the disc plate and the sub-plate by through the intermediate plates, wherein at least one elastic member is maintained at a predetermined amount of compression when a torsional degree between the flange and each of the disc plate and the sub-plate is changed to be larger than the predetermined amount thereof and the other elastic members are continued to be compressed exceeding the predetermined amount of compression.

BRIEF DESCRIPTION OF THE DRAWINGS

The features and advantages of the torque vibration absorbing device according to the present invention will be more clearly appreciated from the following description in conjunction with the accompanying drawings wherein.

DETAILED DESCRIPTION OF PREFERRED EMBODIMENTS OF THE INVENTION

Figure 1:
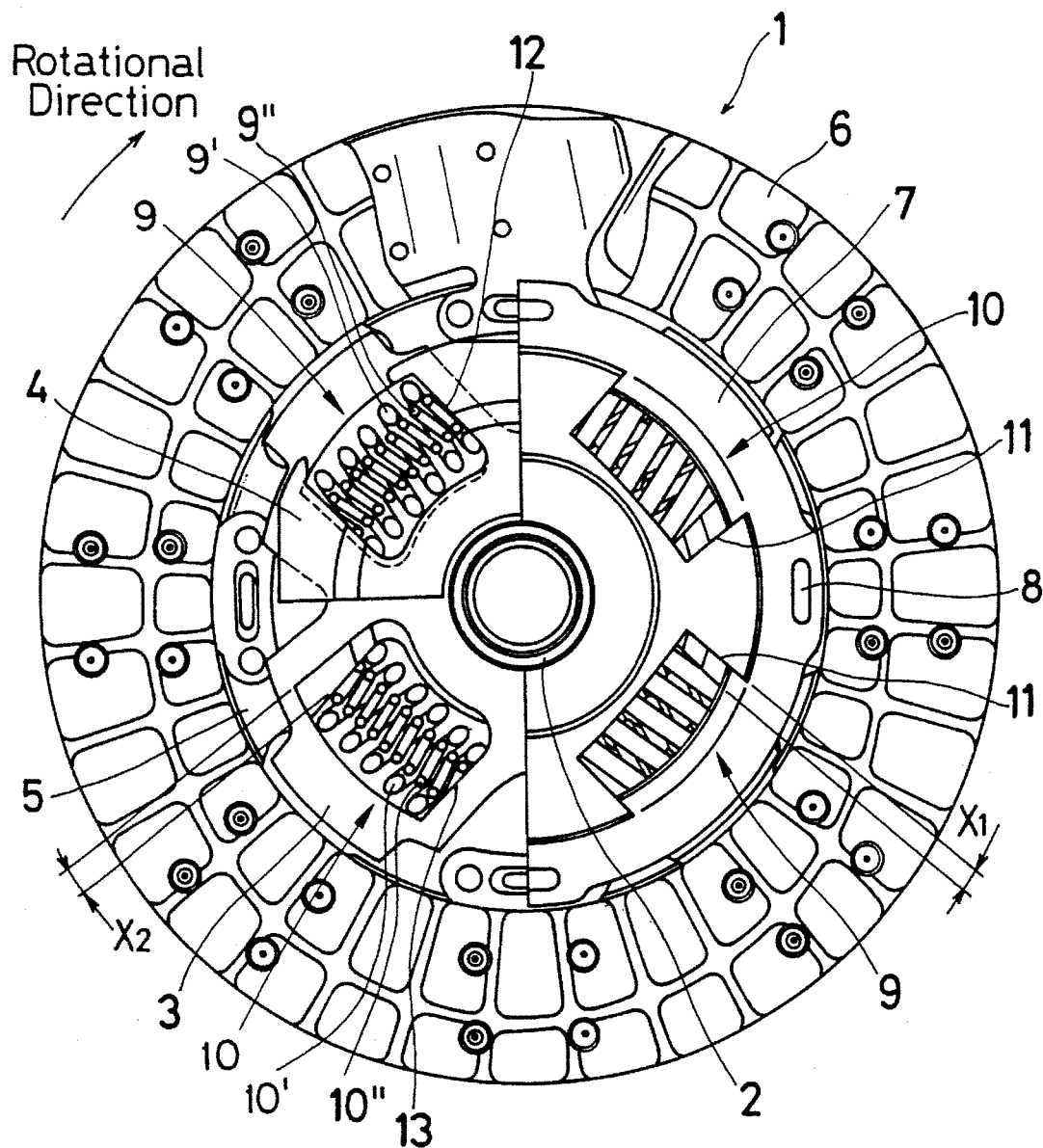
FIG. 1 is a front view of a first embodiment of a torque vibration absorbing device of the present invention.
Figure 2:
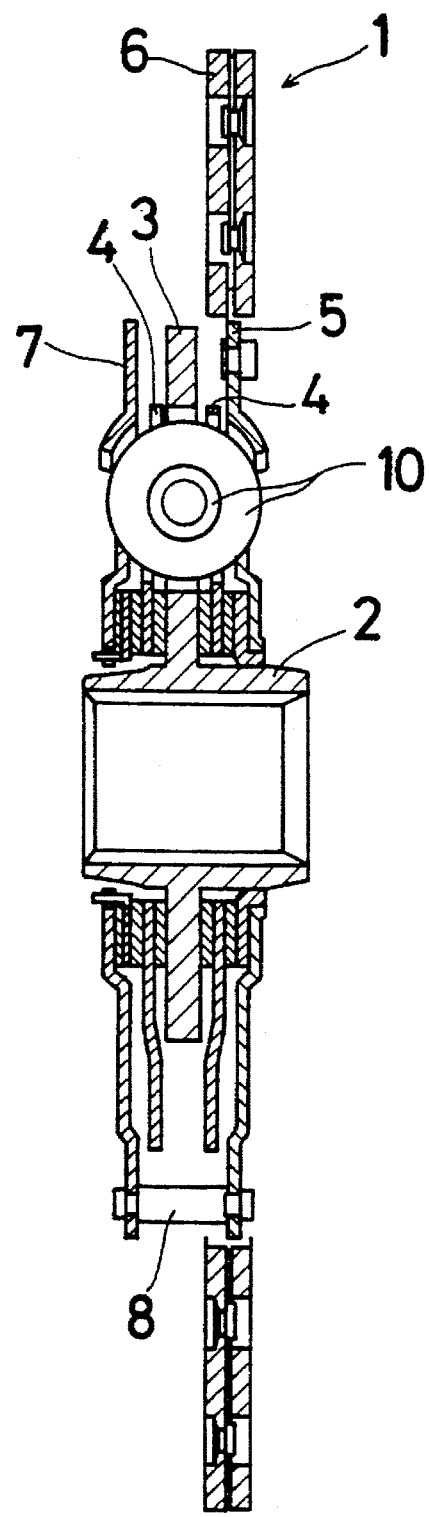
FIG. 2 is a sectional view of a torque vibration absorbing device shown in FIG. 1.

Referring to FIG. 1 and FIG. 2 a clutch disc 1, as a torque vibration absorbing device, mounted on a vehicle comprises a clutch hub 2 with a flange 3, and a pair of intermediate plates 4 disposed at both outer sides of the flange 3 so as to be rotatable relative to the flange 3. The clutch disc I includes a disc plate 5 with a clutch facing 6 and a sub-plate 7 disposed at the outer sides of the intermediate plates 4 so as to be rotatable relative to the flange 3 and the intermediate plates 4, and a plurality of connecting pins 8 which connect the disc plate 5 and the sub-plate 7 for preventing relative rotation between the disc plate 5 and the sub-plate 7. The device includes a pair of elastic members 9 which each include inner and outer springs 9", 9'. The pair of elastic members 9 are positioned diametrically opposite one another. Also, another pair of elastic members 10 is provided which each include an inner and an outer spring 10", 10'. The pair of elastic members 10 are positioned diametrically opposite one another. When the clutch disc 1 is in a position where there is no torsional angle between the flange 3 and each of the disc plate 5 and the sub-plate 7 in an initial stage, each elastic member 9 and 10 is alternately placed in one of four first openings 11 formed in each of the disc plate 5 and the sub-plate 7 with a clearance to the first openings 11. Each of the elastic members 9 and 10 is in the form of a torsional spring with the same spring constant k. In the initial stage the elastic members 9 and 10 are compressed in one of four second openings 12 formed in each of the intermediate plates 4, and are placed in one of four third openings 13 formed in the flange 3 with a clearance to the third openings 13.

Figure 3A:
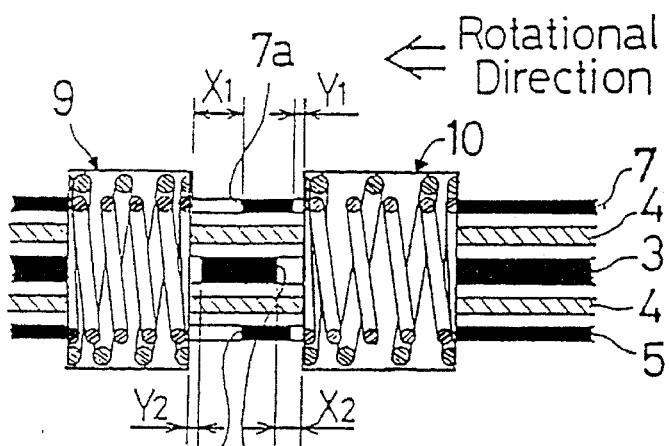
FIG. 3a is a schematic view of a torque vibration absorbing device under an initial stage.
Figure 6:
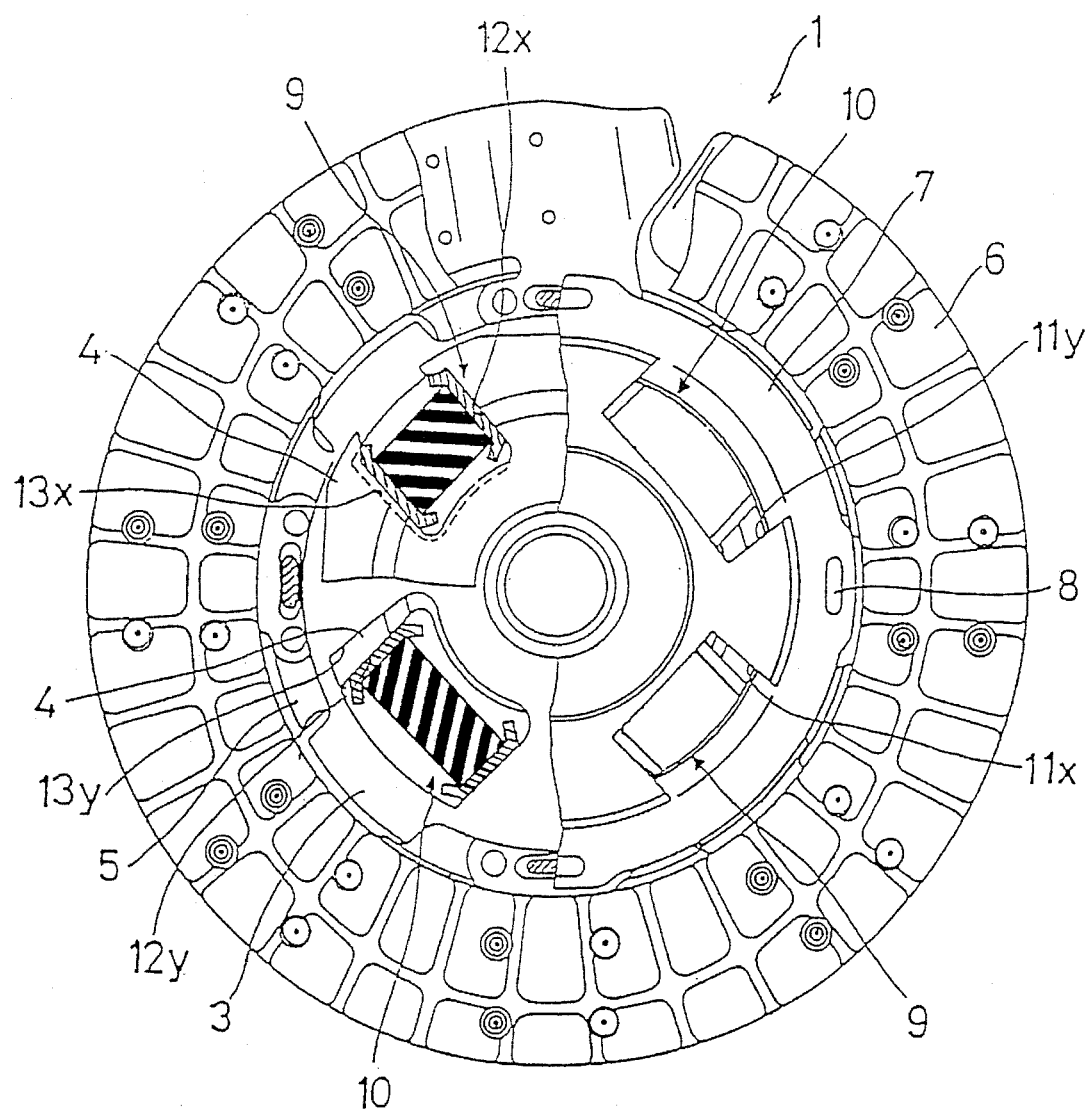
FIG. 6 is a front view of a torque vibration absorbing device according to another embodiment of the invention.

An operation of the clutch disc 1 according to the present invention under acceleration of the vehicle will be described hereinafter. The manner in which the clutch disc 1 functions will be explained below with reference to FIGS. 3a, 3b, 3c and 3d. For purposes of simplifying the explanation, the operation will be described from the standpoint; in which the disc plate 5 and the sub-plate 7 are fixed and the flange 3 is moved toward the right hand side is shown in FIG. 3a, FIG. 3b, FIG. 3c and FIG. 3d. However, in the actual operation of the device, it is to be understood that the input comes through the plates to the hub. For simplifying of the explanation, the clutch disc 1 is illustrated as possessing only one elastic member 9 and only one elastic member 10 in FIG. 3a, FIG. 3b, FIG. 3c and FIG. 3d. Also, FIGS. 6, depicts the elastic members 9, 10 as being elastic rubber elements which represents an alternative to the compression springs shown in FIGS. 1 and 2; In FIG. 3a the clutch disc 1 under the initial stage is shown. In FIG. 3a a clearance $X_1$ is set between the elastic member 9 and the first openings 11 provided in the disc plate 5 and the sub-plate 7 so as to be larger than a clearance $X_2$ set between the elastic member 10 and the third opening 13 provided in the flange 3. In the initial stage a clearance $Y_1$ is set between the elastic member 10 and the first openings 11 so as to be larger than a clearance $Y_2$ set between the elastic member 9 and the third opening 13.

Figure 3B:
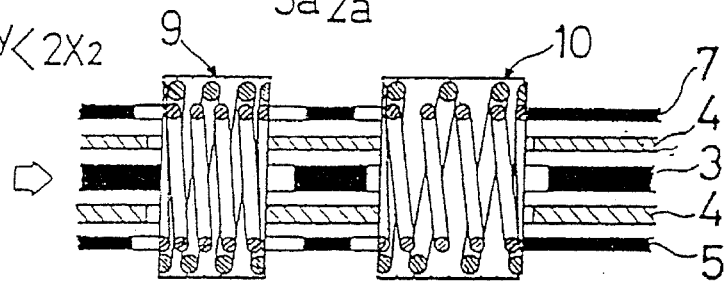
FIG. 3b is a schematic view of a torque vibration absorbing device under a second stage.

In FIG. 3b the clutch disc 1 under a second stage is shown. In FIG. 3b the flange 3 is moved toward the right against the disc plate 5 and sub-plate 7 by transmitting driving force from an engine of the vehicle to the clutch disc 1, and the moving stroke of the flange 3 to the disc plate 5 and sub-plate 7. That is, the torsional amount of movement of the flange 3 with respect to each of the disc plate 5 and the sub-plate 7, is larger than "0" and less than $2X_2$. In the second stage the elastic member 9 is compressed toward the right by the flange 3, and the intermediate plates 4 are moved toward the right by the force from the compressed elastic member 9. Therefore the elastic member 10 is compressed between the intermediate plates 4 and each of the disc plate 5 and the sub-plate 7.

Figure 3C:
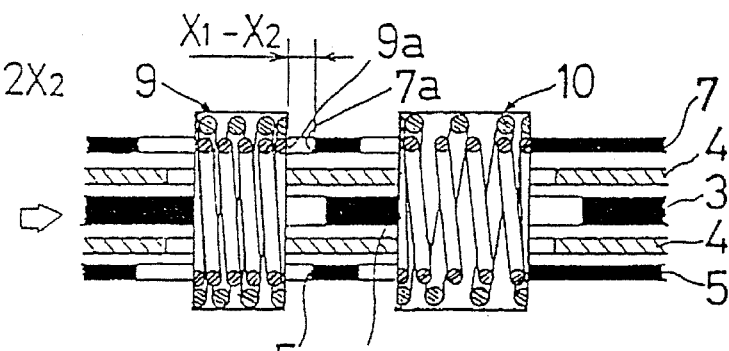
FIG. 3c is a schematic view of a torque vibration absorbing device under a third stage.

In FIG. 3c the clutch disc I under a third stage is shown. In FIG. 3c the torsional amount of movement of the flange 3 with respect to each of the disc plate 5 and the sub-plate 7 reaches $2X_2$. In FIG. 3c an end surface 2a of the flange 3 is contacts to a surface 10a of the elastic member 10, and the clutch disc 1 possesses a clearance $X_1-X_2$ between a surface 9a of the elastic member 9 and each of the end surfaces 5a and 7a of the disc plate 5 and the sub-plate 7.

Figure 3D:
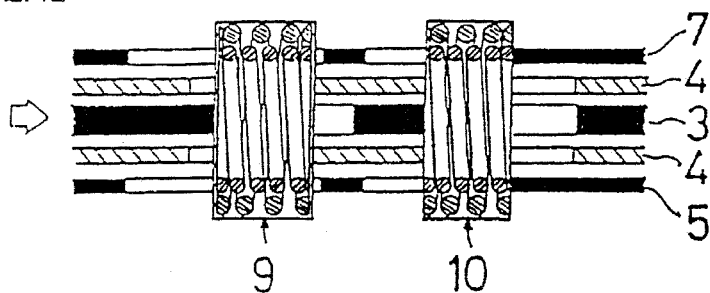
FIG. 3d is a schematic view of a torque vibration absorbing device under a final stage.

In FIG. 3d the clutch disc 1 under a final stage is shown. In FIG. 3d the torsional amount of movement of the flange 3 with respect to each of the disc plate 5 and the sub-plate 7 is larger than $2X_2$. In FIG. 3d the flange 3 fails to move relative to the intermediate plates 4, and the flange 3 and the intermediate plates 4 move toward the right in a body or as a unit. Under the final stage the elastic member 9 fails to be further compressed because the elastic member 9 is held between the flange 3 and the intermediate plates 4. To the contrary the elastic member 10 proceeds to be compressed at the final stage because the elastic member 10 is held between the flange 3 and each of the disc plate 5 and the sub-plate 7.

As for the spring constant of each of the elastic member 9 and 10 under the above stages, when the moving stroke or displacement of the flange 3 with respect to each of the disc plate 5 and the sub-plate 7 is less than $2X_2$ under the initial stage or the second stage, the spring constant $k_1$ defined as the summation of the spring constant of the elastic members 9 and 10 is k/2 because of the compression of the elastic member 9 and 10. When the above moving stroke of flange 3 is larger than $2X_2$ under the third stage or the final stage, the spring constant $k_2$ defined as the summation of the spring constant of the elastic members 9 and 10 is k because of the proceeding of the compression of the elastic member 10 and the interruption of the compression of the elastic member 9. After all the spring constant $k_2$ under the third stage or the final stage is twice as large as the spring constant $k_1$ under the initial stage or the second stage.

Figure 4:
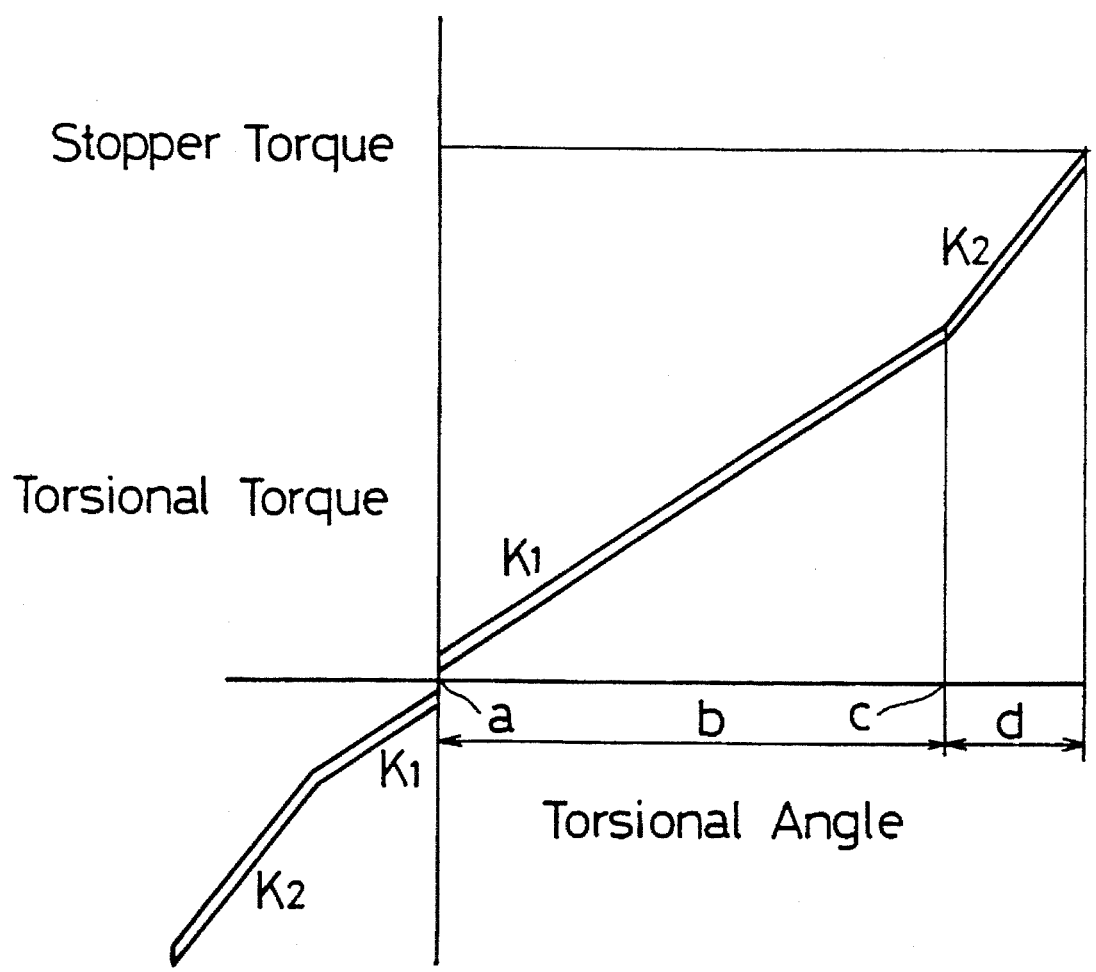
FIG. 4 is a characteristic diagram shows the relation between the torsional angle and the torsional torque of a torque vibration absorbing device in FIG. 1 and FIG. 2.

In FIG. 4, a diagram of the torque generated between the flange 3 and each of the disc plate 5 and the sub-plate 7 relative to the torsional angle between the flange 3 and each of the disc plate 5 and the sub-plate 7 is shown. In FIG. 4, references "a", "b", "c" and "d" correspond to the conditions indicated in FIG. 3a, FIG. 3b, FIG. 3c and FIG. 3d respectively. In FIG. 4 the clutch disc 1 is able to increase the torsional stiffness and the stopper torque under the region of the wide torsional angle between the flange 3 and each of the disc plate 5 and the sub-plate 7 because of the interruption of the compression of at least one elastic member. Furthermore the clutch disc 1 is able to reduce the vibration and the noise generated in a series of the driving axle system under the region of the middle and narrow torsional angle between the flange 3 and each of the disc plate 5 and the subplate 7 because of the proceeding of the compression of all of the elastic members. Moreover because the clutch disc 1 does not comprise any elastic member other than the elastic members 9 and 10 disposed in series with each other, the clutch disc 1 is able to prevent the sharp variation of the torsional torque at the "c" point of the torsional angle in FIG. 4. Therefore the clutch disc 1 possesses the smooth variation of the torsional stiffness, and the effect is to prevent the vibration and the noise in the series of the driving axle.

The elastic members included in the torque vibration absorbing device according to the invention may possess different spring constants with respect to each other. Establishing the spring constant of the elastic member 9 is k and that of the elastic member 10 is 2k, the spring constant composed of that of the elastic members 9 and 10 is 2k/3 $\{=1/(1/k+\frac{1}{2}k)\}$ under the region of the middle and narrow torsional angle, and the composed spring constant is 2k under the region of the wide torsional angle. Therefore the composed spring constant under the region of the wide torsional angle is three times as large as that under the region of the middle and narrow torsional angle.

Figure 5:
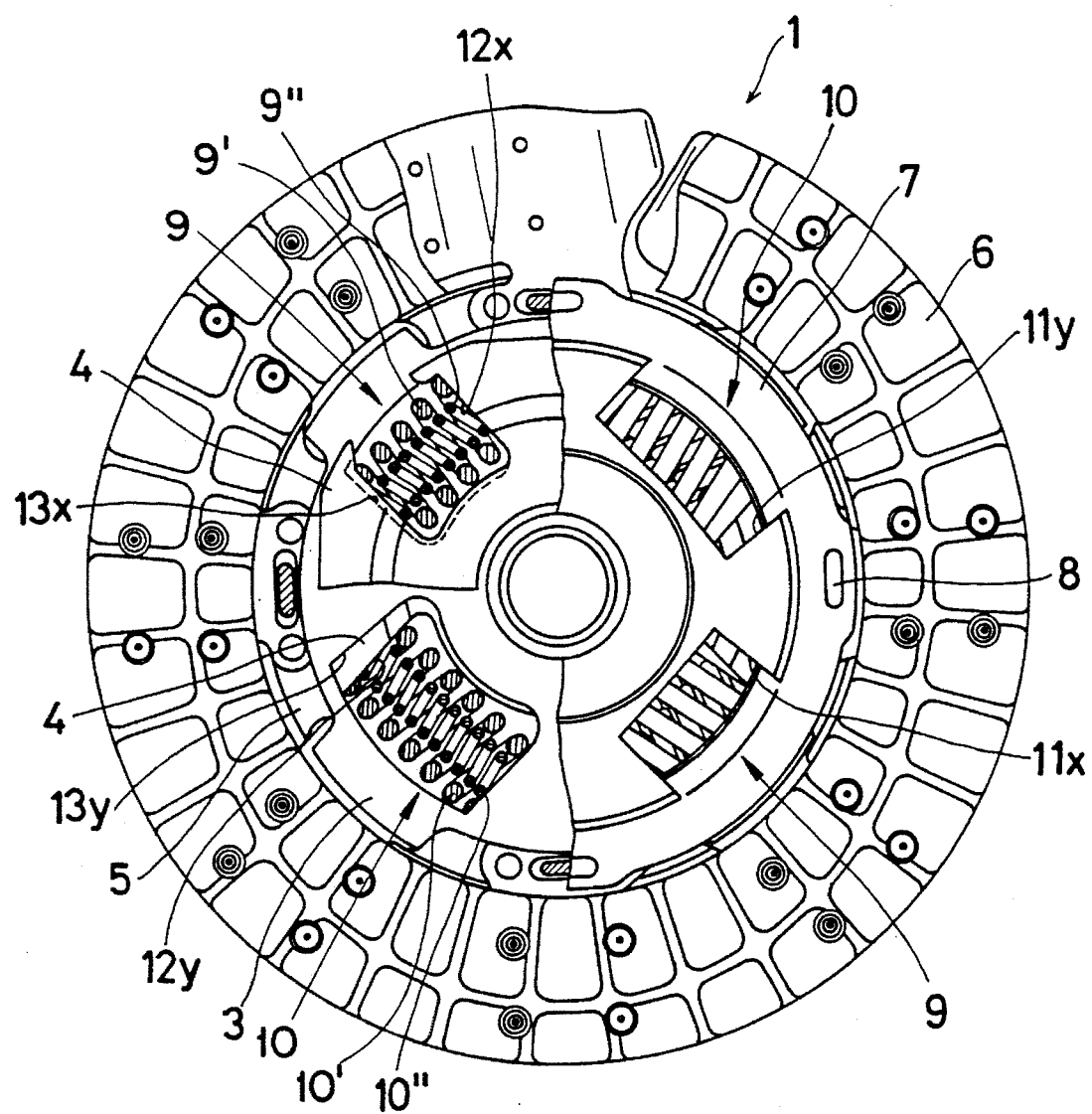
FIG. 5 is a front view of a second embodiment of a torque vibration absorbing device of the present invention.

A torque variation absorbing device of a second embodiment is shown in FIG. 5. When the clutch disc 1 is in a position in which there is no torsional or angular movement between the flange 3 and each of the disc plate 5 and the sub-plate 7 in the initial stage, each elastic member 9 is placed in a first opening 11x formed in the disc plate 5 and the sub-plate 7 with a clearance to the first opening 11x. On the other hand each elastic member 10 is placed in a first opening 11y formed in the disc plate 5 and the sub-plate 7 with a clearance to the first opening 11y. Each of the elastic members 9 and 10 is in the form of a torsional spring with the same spring constant k. In the initial stage each of the two elastic members 9 is compressed in a second opening 12x formed in each of the intermediate plates 4, and is placed in a third opening 13x formed in the flange 3 with a clearance to the third opening 13x. Each of the two elastic members 10 is compressed in a second opening 12y formed in each of the intermediate plates 4, and is placed in a third opening 13y formed in the flange 3 with a clearance to the third opening 13y. Each of the second openings 12y is provided to be larger in the direction of the circumference than each of the second openings 12x. Therefore each of the elastic members 10 is set to be longer than each of the elastic members 9 in the initial stage. Furthermore each of the first openings 11y is provided to be larger in the direction of the circumference than each of the first openings 11x and the third opening 13y is provided to be larger in the direction of the circumference than the third opening 13x.

With the above construction because each of the elastic members 10 is set to be longer than each of the elastic members 9 in the initial stage, each of the elastic members 10 possesses small stress in comparison with each of the elastic members 9. Therefore when the amount of torsional or angular movement of the flange 3 with respect to each of the disc plate 5 and the sub-plate 7 exceeds $2X_2$, each of the elastic members 10 is able to continue to be compressed. Consequently the torque vibration absorbing device increases its torsional angle and the torsional torque to be used. When the amount of torsional or angular movement amount of the flange 3 with respect to each of the disc plate 5 and the sub-plate 7 reaches maximum, each of the elastic members 10 possesses stress which is as large as the stress of each of The elastic members 9 at the stage when the amount of torsional or angular movement of the flange 3 with respect to each of the disc plate 5 and the sub-plate 7 is $2X_2$.

Furthermore the torque vibration absorbing device may comprise a construction such that the length of each of the second openings 12x in the direction of the circumference is provided to be equal to the length of each of the second openings 12y in the direction of the circumference, and the free length of each of the elastic members 10 is provided to be shorter than the free length of each of the elastic members 9.

While the invention has been particularly shown and described with reference to preferred embodiment thereof, it will be understood by those skilled in tile art that the foregoing and other changes in form and details can be made therein without departing from the spirit and scope of the invention.

What is claimed is:

1. A torque vibration absorbing device comprising:
   a clutch hub with a radially extending flange;
   a pair of intermediate plates each disposed at an axially outer side of the flange and being rotatable relative to the flange;
   a disc plate and a sub-plate each disposed at an axially outer side of one of the intermediate plates, the disc plate and the sub-plate being rotatable relative to the flange and the intermediate plates; and
   a plurality of elastic members arranged in series between the disc plate and the sub-plate through the intermediate plates, the elastic members including a first elastic member and a second elastic member which are each compressed during angular movement between the flange and each of the disc plate and the sub-plate, said first and second elastic members being arranged so that during initial angular movement of the disc plate and sub-plate relative to the flange the first elastic member is compressed a first predetermined amount and the second elastic member is compressed a second predetermined amount, and during subsequent angular movement of the disc plate and sub-plate relative to the flange the second elastic member continues to be compressed beyond said second predetermined amount while the first elastic member remains compressed at said first predetermined amount.

2. A torque vibration absorbing device as recited in claim 1, wherein each of the elastic members is in the form of a compression spring.

3. A torque vibration absorbing deice as recited in claim 1, wherein each of the elastic members is in the form of an elastic rubber element.

4. A torque vibration absorbing device as recited in claim 1, wherein the elastic members each possess a spring constant, the spring constants of the elastic members being equal to each other.

5. A torque vibration absorbing device as recited in claim 1, wherein when the amount of angular movement between the flange and each of the disc plate and the sub-plate reaches a maximum, the second elastic member possesses a stress which is as large as the stress of the first elastic member when the amount of angular movement between the flange and each of the disc plate and the sub-plate is less than the maximum.

6. A torque vibration absorbing device comprising:
   a clutch hub provided with a radially extending flange, said clutch hub and flange being rotatable in a direction of rotation;
   a pair of intermediate plates each disposed at an axially outer side of the flange and being rotatable relative to the flange;
   a disc plate and a sub-plate each disposed at an axially outer side of one of the intermediate plates, the disc plate and the sub-plate being rotatable relative to the flange and the intermediate plates; and
   a plurality of elastic members arranged in series between the disc plate and the sub-plate through the intermediate plates, said elastic members each being located in a respective opening in the flange, each elastic member being disposed so that prior to angular movement of the disc plate and sub-plate relative to the flange a clearance is provided between each elastic member and an edge of the respective opening in the direction of rotation of the flange, the elastic members including a first elastic member and a second elastic member, the clearance of the first elastic member with respect to the edge of the respective opening being smaller than the clearance of the second elastic member with respect to the edge of the respective opening.

7. A torque vibration absorbing device as recited in claim 6, wherein each of the elastic members is in the form of a compression spring.

8. A torque vibration absorbing device as recited in claim 6, wherein each of the elastic members is in the form of an elastic rubber element.

9. A torque vibration absorbing device as recited in claim 6, wherein the elastic members each possess a spring constant, the spring constants of the elastic members being equal to each other.

10. A torque vibration absorbing device as recited in claim 6, wherein when the amount of angular movement between the flange and each of the disc plate and the sub-plate is maximum, the second elastic member possesses a stress which is as large as a stress of the first elastic member when the clearance of the second elastic member with respect to the respective opening in the flange is eliminated by the angular movement between the flange and each of the disc plate and the sub-plate.

11. A torque vibration absorbing device as recited in claim 6, wherein each elastic member is located in a respective second opening in both the disc plate and the sub-plate, each elastic member being disposed so that prior to angular movement of the disc plate and sub-plate relative to the flange a clearance exists between each elastic member and an edge of the respective second opening in the disc plate and the sub-plate.

* * * * *